United States Patent [19]

Evangelisti

[11] Patent Number: 5,653,869
[45] Date of Patent: Aug. 5, 1997

[54] FILTRATION CHAMBER WITH FAST LOCKING SYSTEM

[75] Inventor: Ivano Evangelisti, Bergamo, Italy

[73] Assignee: 3V Cogeim S.p.A., Milan, Italy

[21] Appl. No.: 436,806

[22] Filed: May 5, 1995

[30] Foreign Application Priority Data

May 6, 1994 [IT] Italy ................... MI94A0895

[51] Int. Cl.⁶ .............. B01D 35/30; B01D 35/31; B01D 29/05
[52] U.S. Cl. .............. 210/232; 210/236; 210/450; 210/453; 210/489; 210/495
[58] Field of Search .............. 210/232, 415, 210/446, 450, 453, 454, 489, 492, 236, 484, 471, 495

[56] References Cited

U.S. PATENT DOCUMENTS

| | | |
|---|---|---|
| 2,313,237 | 3/1943 | Hois . |
| 2,404,215 | 7/1946 | Cavanaugi . |
| 2,464,921 | 3/1949 | Chandler . |
| 2,654,097 | 10/1953 | Epstein . |
| 2,916,143 | 12/1959 | McConalogue . |
| 3,980,560 | 9/1976 | Eades . |
| 4,376,705 | 3/1983 | Komura . |
| 4,477,347 | 10/1984 | Sylva . |
| 4,497,709 | 2/1985 | Nicholson . |
| 4,684,466 | 8/1987 | Terpstra . |
| 4,732,294 | 3/1988 | Bohler . |
| 4,828,697 | 5/1989 | Kuhnt . |

FOREIGN PATENT DOCUMENTS

| | | |
|---|---|---|
| 0 471 195 | 2/1992 | European Pat. Off. . |
| 2 591 121 | 6/1987 | France . |
| 2950300 | 6/1981 | Germany . |
| 32 00 443 | 8/1982 | Germany . |
| 2 034 190 | 6/1980 | United Kingdom . |

*Primary Examiner*—Thomas M. Lithgow
*Attorney, Agent, or Firm*—Young & Thompson

[57] ABSTRACT

Filtration chamber consisting of a cylindrical vessel having a bottom plate (1a) forming a support for the filtering system (11), this latter comprising a filter sheet (11a) and a filter netting bed (11b), both anchored to the bottom plate (1a). The filter sheet (11a) and the filter bed (11b) are fixed at their periphery onto an anchor ring (10), provided with a bayonet system (10a, 1c) for rapidly locking it onto the bottom support plate (1a). The filter sheet (11a), in the form of a punched plate or of a gate, and the filter bed (11b), in the form of a wire net, are fixed to the anchor ring (10), along its entire periphery, by welding. Three O-Ring type toroidal sealing gaskets (13, 15, 16) are positioned between opposed horizontal surfaces—of the bottom plate (1a), of the anchor ring (10), and of a rib (14) of the chamber wall (2)—so that the operation to for closing the bottom (1) of the chamber causes the simultaneous tightening of all the gaskets.

20 Claims, 4 Drawing Sheets

FILTRATION CHAMBER WITH FAST LOCKING SYSTEM

BACKGROUND OF THE INVENTION

As known, particularly in the technique of chemical, pharmaceutical and like productions, use is made of large filtration chambers, generally consisting of cylindrical vessels comprising a bottom part, which normally—but not necessarily—consists of a flat base, and a dome-shaped top part, such vessels having diameters which vary between 300 and 5000 mm.

The bottom part of these chambers is particularly important, as the separation of the liquids from the solids takes place therein.

The bottom of these filtration chambers normally consists of:

A very thick metal support plate, meant to stand the working pressure—usually between 0.5 bar and over 10 bar—and to bear the load of the material being filtered; the plate comprises at least one outlet for the filtered liquid. The plate also carries a system to support the filter sheet;

A filter sheet bearing onto the support plate, through the system, and generally consisting of punched plates with constant pitch. The punched are normally connected to the support plate along their entire by screws;

A filter bed, bearing onto the filter sheet and generally consisting of wire or synthetic nets, interwoven in such a way as to ensure the of particles having dimensions below the nominal size of the actual net. Such nets are positioned exactly above the filter bed, and hey are tensioned and connected to the support plate by screws or by into a groove.

To allow opening these vessels, the bottom part is normally made disconnectable from the dome-shaped top part. For this purpose, the cylindrical dome and the filtering bottom are each equipped with an coupling flange, having a plurality of through holes to house lightening bolts.

This arrangement, —which is also very well known in other fields, —has the advantage of allowing a positively reliable fastening between the coupling flanges, such as to provide—thanks to the squeezing of an interposed gasket—a perfect seal both for the liquids and for the gases contained in the chamber.

Another known system for locking together the cylindrical dome and the filtering bottom is a bayonet coupling system. In this case, use is made of a rotating ring, operated by pneumatic or hydraulic cylinders, which cooperates with said two flanges; this rotating ring is in fact provided with an upper flange, which opposes the flange of the cylindrical dome, and with a lower flange comprising teeth with upward wedges, which opposes the flange of the filtering bottom being itself provided with wedge-shaped teeth.

When the ring is rotated under the action of the pneumatic hydraulic cylinders, the wedges of the teeth of its lower flange are driven in contact with those of the filtering bottom flange; they thus cause the squeezing of the gasket interposed between the flanges of the filtering chamber, thereby providing the seal.

The need to carry out periodically the cleaning of the filtering parts makes it indispensable to often disassemble, reassemble and lock again the various parts of the filtering bottom. It can be easily understood how these operations, fop a conventional filtering structure of the aforecited type, require very long times in order to be able to unscrew and screw again a high number of screws and/or bolts: for instance, in the case of a 2000 mm diameter chamber, even 200 bolts may be present, since one bolt or screw is normally needed every 150 mm, both to fix the filter sheet and to fix the filter netting bed.

Furthermore, the presence of bolts determines material stagnation points, which is in contrast with the cleaning requirements of the filtration chamber.

SUMMARY OF THE INVENTION

The object of the present invention is to propose a structure of filtration chamber, and particularly of its bottom part, which is apt to overcome the above drawbacks and which, while guaranteeing a perfect sealing, allows to disassemble and reassemble the filtering parts with very simple and fast operations. Moreover, the filtration structure allows simpler and more accurate cleaning operations.

This result is achieved—in a filtration chamber of the aformentioned type, consisting of an essentially cylindrical vessel having a bottom plate forming a support for the filtering system, this latter comprising a filter sheet and a filter netting bed, both anchored to the bottom plate—essentially due to the fact that, the filter sheet and the filter bed are fixed at their periphery onto an anchor ring, and that the anchor ring is provided with means for rapidly locking it onto the bottom support plate.

more particularly, the filter sheet is in the form of a punched plate or of a grate, and the filter bed is in the form of a wire net, and they are both fixed to the anchor ring, along its entire periphery, by welding.

BRIEF DESCRIPTION OF THE DRAWINGS

Further characteristics and advantages of the filtration chamber according to the present invention will anyhow be more evident from the following detailed description of a preferred embodiment thereof, given by way of non-limiting example and illustrated on the accompanying drawings, in which.

DESCRIPTION OF THE PREFERRED EMBODIMENT

Figure 1:
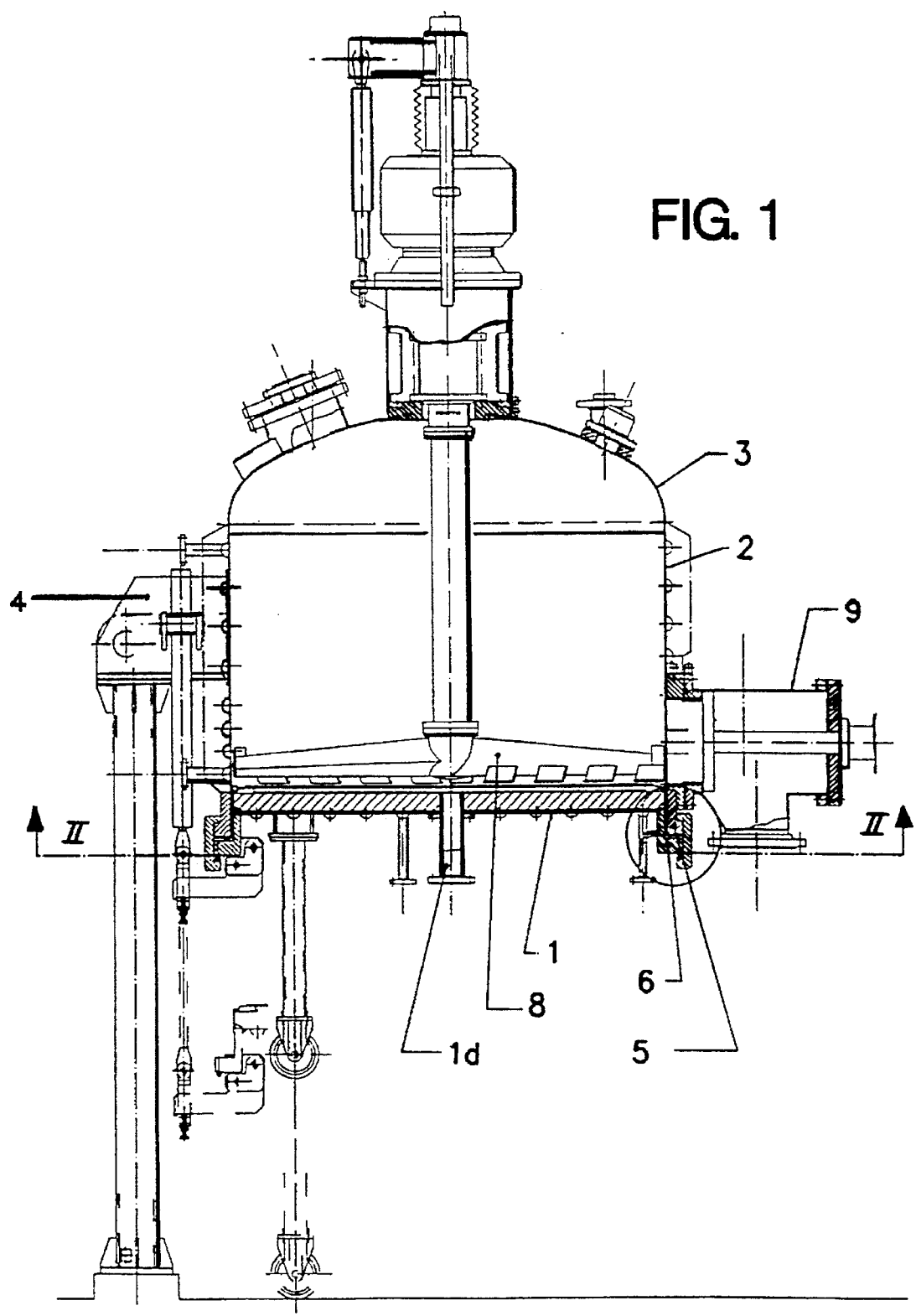
FIG. 1 is a diagrammatic elevation view, partly in axial section, of the filtration chamber according to the invention.

As shown in FIG. 1, the filtration chamber according to the present invention comprises a bottom 1, a cylindrical wall 2 and a dome-shaped cover 3. The cover 3 is fixed by welding onto the cylindrical wall 2, so as to form a single body fixedly supported onto a framework 4.

The bottom 1 is instead mounted so as to move vertically between a lifted position (shown in full lines) to close the filtration chamber, and a lowered position (only partially shown in dashed lines) to open the filtration chamber and allow cleaning and/or maintenance operations.

Two tightening flanges 5, 6, are provided to hermetically seal—in known manner—the filtration chamber, the flange 5 being fixed to the lower edge of its cylindrical wall 2, and the flange 6 being fixed to its bottom 1.

In the illustrated embodiment, the flanges 5, 6, are tightened together—instead of with bolts crossing the flanges, and respective nuts—with a bayonet coupling system, realized by way of the locking ring 7. As clearly shown in FIGS. 3 and 4, the ring 7 has a C-shaped section opening towards the central axis of the chamber. The top branch, or flange, of the C bears against the flange 5, so that the ring 7 can be rotated bearing on said flange 5. The bottom branch, or flange, of the C is formed with a plurality of teeth 7a having a symmetrical configuration and abutting against teeth 6a formed on the flange 6 (detail of FIG. 4). The arrangement of the teeth 6a and 7a represents a known bayonet coupling system. Thanks to this arrangement, when the bottom 1 is lifted—from its lowered opening position, into its closing position—the teeth 6a of its flange 6 are driven into the notches formed between the teeth 7a of the ring 7; once the closing position has been reached, the ring 7 is rotated so as to carry its teeth 7a beneath the teeth 6a and thus obtain the closing of the chamber.

Figure 4:
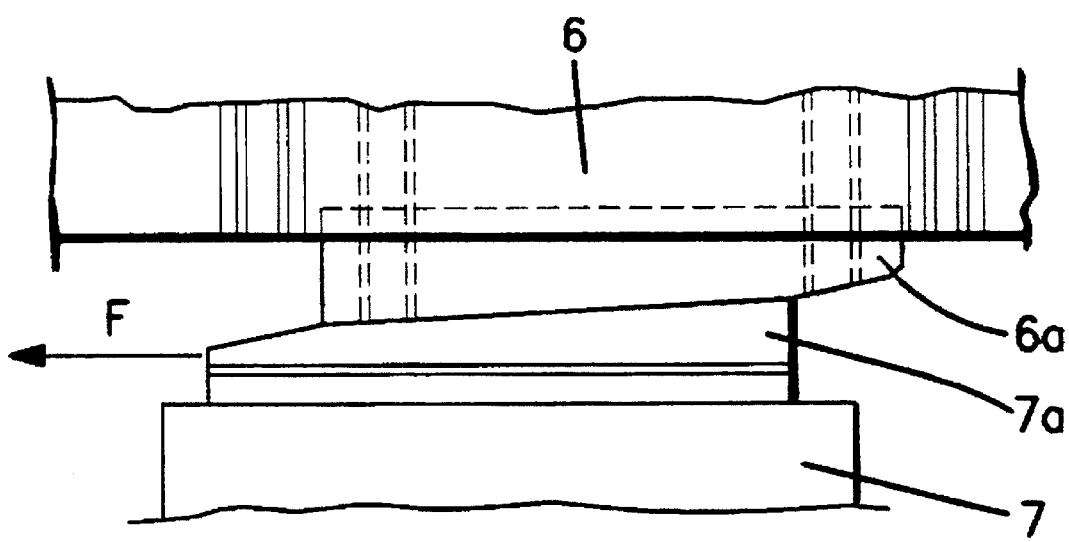
FIG. 4 shows a detail—along the line IV—IV of FIG. 3—of the system tightening the flanges to lock the filtration chamber.

According to the preferred embodiment shown in the drawings, the teeth 6a and 7a have the configuration of opposite wedges, the inclined surfaces of which get into reciprocal contact when the ring 7 is rotated in the direction F of FIG. 4, during the closing step. As can be easily understood, the higher the rotation of the ring 7, in the direction F, the stronger the tightening action between the flanges 5 and 6 which the wedges 6a and 7a are apt to produce.

Figure 2:
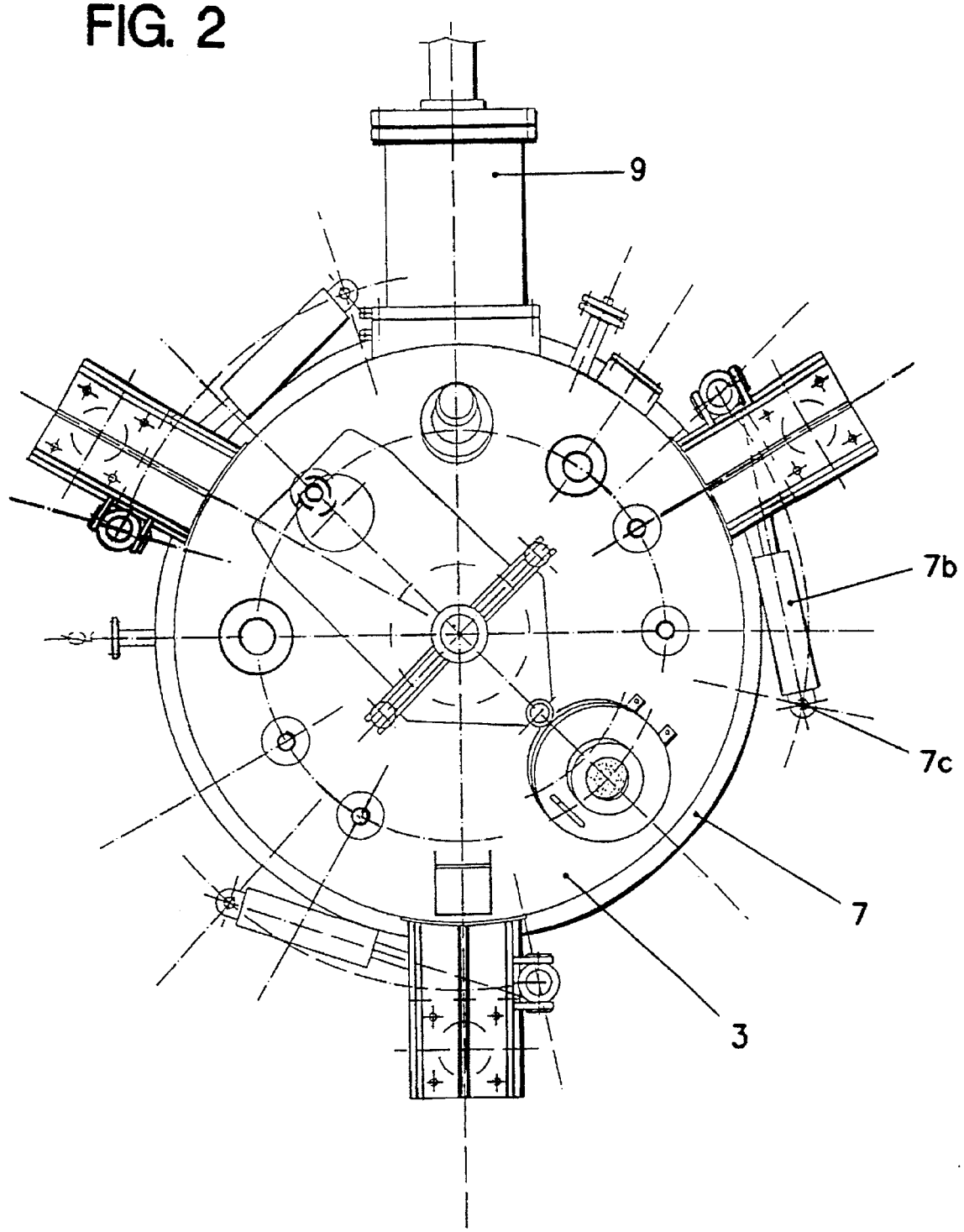
FIG. 2 is a diagrammatic partial plan view along the line II—II of FIG. 1.

To cause the rotation of the ring 7, and thus produce the tightening action, use is made—in the preferred arrangement illustrated on the drawings—of three operating cylinders 7b (FIG. 2), positioned at 120° one in respect of the other along the periphery of the ring 7. The cylinder rod is pivoted onto a pin fixed to the flange 5, while the cylinder body is pivoted onto a pin 7c projecting upwards from a base fixed to the ring 7: when the cylinders 7b are operated, the ring 7 is caused to rotate and to thereby close, or open, the bayonet system.

The bottom 1 incorporates all the elements required to filter the liquid, which will flow out of the chamber through the gate 1d; the remaining solid part will be eliminated with the help of the stirrer 8 the exhaust port 9 (FIG. 1).

Figure 3:
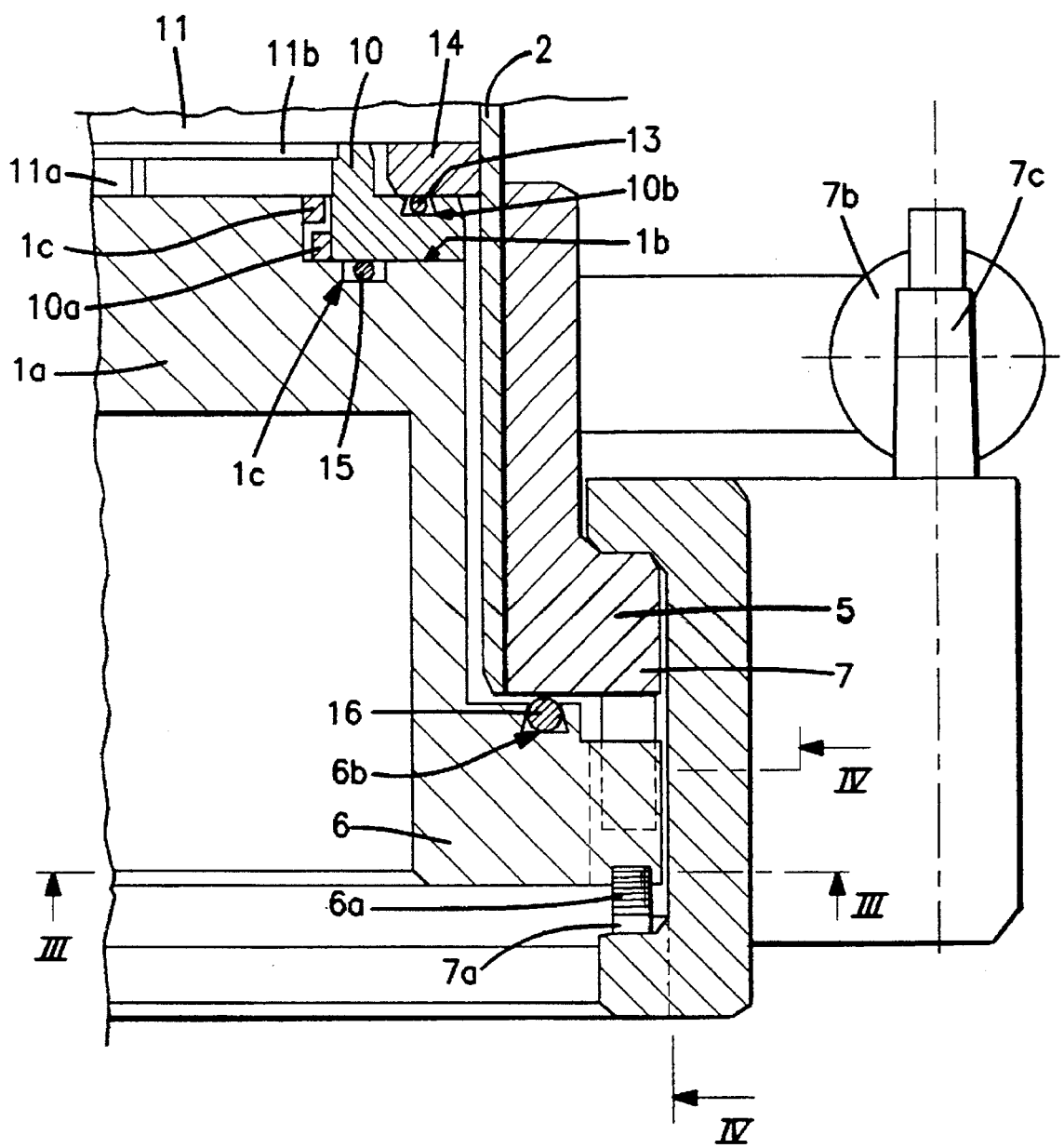
FIG. 3 is a vertical section view, on an enlarged scale, of the detail A of FIG. 1.

FIG. 3 illustrates more clearly the main elements of the invention and, precisely, the structure of the filtering bottom, which comprises:

The support plate 1a: it is a very thick plate, meant to support the load determined by the inner pressure and by the weight of the product. Its round central part is flat, while the external annular zone is machined so as to form an annular shoulder 1b. As opposed to the known support plates, the support plate according to the invention is flat, or slightly conical in a direction of the exhaust gate 1d, or outwardly inclined, to the full advantage of an easy maintenance;

The anchor ring 10: it is a ring body with a substantially L-shaped section. The horizontal branch of the L is apt to house itself into the annular shoulder 1b of the plate 1a, while its vertical branch is apt to support the filtering system. According to another essential characteristic of the invention, the ring 10 is mounted and fixed onto the support plate 1a through a bayonet system, formed by a plurality of teeth 1c radially and outwardly projecting from the plate 1a and, respectively, by a plurality of teeth 10a radially and outwardly projecting from the ring 10. The teeth are distributed at regular intervals along the periphery of the plate 1a and, respectively, of the ring 10, with a pitch substantially corresponding to their peripheral dimension. To obtain the engagement and disengagement of the bayonet system, the rotation of the ring 10 can be controlled either manually or by servo control;

The filtering system; this system comprises, in known manner, a filter sheet 11a and a filter netting bed 11b. The filter sheet 11a consists of a stiff grate of suitable pitch, apt to form a support for the filter netting bed 11b. The netting determines the desired filtering mesh: it is usually a wire net, bearing onto the grate 11a and fixed onto the anchor ring 10. According to another important characteristic of the invention, both the grate 11a and the wire net 11b are welded onto the anchor ring 10 along their entire periphery. Use can also be made of a net of synthetic material; in this case, the net is fixed onto the anchor ring by other known means, for instance by packing into a suitable groove. In this manner, the ring 10, the grate 11a and the netting 11b form a unitary and unseparable assembly, comprising no projecting (like the known bolt and nut heads generally used as fixing means), and thus lending itself to an easy but accurate cleaning operation. The assembly is easily positioned, assembled and disassembled, into the shoulder 1b of the bottom plate 1a.

According to a further fundamental characteristic of the invention, the perfect sealing of the filtration chamber and, in particular, the tightness between the bottom support plate and the filtering system, is obtained by means of a multiple system of annular gaskets (flat; toroidal O-Ring gaskets; of the packing type; or of other geometrical shapes suited for the purpose). The multiple system comprises:

a first sealing gasket 13, housed into an annular groove 10b formed into the upper surface of the anchor ring 10 and opening upwards; the gasket 13 presses against the lower surface of an annular rib 14 welded to the inner surface of the cylindrical wall 2 of the filtration chamber; a second sealing gasket 15, housed into an annular groove 1c formed into the upper surface of the shoulder 1b and opening upwards; the gasket 15 presses against the lower surface of the anchor ring 10;

a third sealing gasket 16, housed into an annular groove 6b formed into the upper surface of the flange 6 and opening upwards; the gasket 16 presses against the lower surface of the flange 5.

The locking performed by mere tightening of the flanges 5 and 6—whether obtained through a bayonet system, as described heretofore, or through a conventional bolt and nut system—allows to simultaneously tighten all the three sealing gaskets and to thus provide a perfect seal between all the components of the structure.

This set of gaskets provides a perfectly hermetic seal even in the event that the locking, obtained through the bayonet system, should not produce such a positive and close tightening of the two flanges 5, 6, as in the case of using the conventional tightening bolts.

The filtration chamber according to the present invention, as described heretofore, hence comprises no screw couplings and thus allows to easily carry out the following operations, which are mostly automatic:

In the opening step:

by means of the hydraulic cylinders 7b one causes the rotation of the ring 7 in the direction opposite to the arrow F (FIG. 4) to remove the outer bayonet coupling;

also by means of a hydraulic system one lowers the bottom 1 of the filtration chamber;

the filtering system 10, 11, is released by rotating the anchor ring 10, so as to remove the inner bayonet coupling; cleaning or replacement of the system can thus be carried out.

In the closing step:

the filtering system 10, 11, is repositioned by housing the ring 10 into the shoulder 1b, and is locked in position by rotating the anchor ring 10 to restore the inner bayonet coupling;

the filtration chamber is closed;

by means of the hydraulic cylinders 7b one causes the rotation of the ring 7 in the direction F (FIG. 4) to restore the outer bayonet coupling, thereby simultaneously obtaining the locking and the perfect tightening of the sealing gaskets. The filtering system is thus ready to operate.

As can be seen, the time required for such operations is extremely limited and these are highly facilitated in respect of the methods used in prior art. The opening, disassembly, filter cleaning or replacement, reassembly and closing operations thus become far simpler and much faster, since no bolts and nuts have to be unscrewed or screwed to disassemble and reassemble the filtering system.

Furthermore, the filtering system 10, 11, is so easy to disassemble as to make it convenient, for the required cleaning and maintenance operations, to remove and carry the same into more equipped and comfortable workshops, in order to favour the personnel dealing therewith.

It is anyhow understood that the invention is not limited to the particular embodiment illustrated heretofore, which merely forms a non-limiting example of its scope, but that a number of variants can be introduced, all within reach of a technician skilled in the art, without thereby departing from the protection field of the invention itself.

I claim:

1. Filtration chamber comprising: an essentially cylindrical vessel having a detachable bottom plate forming a support for a filtering system, said filtering system comprising a filter sheet and a filter netting bed, both anchored to said bottom plate, said filter sheet and said filter netting bed being fixed at their periphery onto an anchor ring, and said anchor ring being provided with means for rapidly locking it onto said bottom plate.

2. Filtration chamber according to claim 1, wherein said filter sheet is in the form of a punched plate, and is fixed to said anchor ring along its entire periphery by welding.

3. Filtration chamber according to claim 1, wherein said filter sheet is in the form of a grate, and is fixed to said anchor ring along its entire periphery by welding.

4. Filtration chamber according to claim 1, wherein said filter netting bed is a wire net, and is fixed to said anchor ring along its entire periphery by welding.

5. Filtration chamber according to claim 1, wherein said filter netting bed is a net of synthetic material, and is fixed to said anchor ring along its entire periphery by packing into a groove.

6. Filtration chamber according to claim 1, wherein said means for rapidly locking said anchor ring onto the bottom plate comprise a bayonet system.

7. Filtration chamber according to claim 6, wherein said bayonet system comprises a plurality of bayonet anchor teeth distributed along the periphery of said anchor ring.

8. Filtration chamber according to claim 7, wherein said anchor ring is housed into an annular shoulder formed along the periphery of said bottom plate, said bayonet anchor teeth being formed on the inner periphery of said anchor ring and, respectively, on the peripheral surface of said annular shoulder facing the ring.

9. Filtration chamber according to claim 1, further comprising a multiple system of sealing gaskets positioned in annular grooves between opposed horizontal surfaces, such that the operation of locking the bottom plate against the cylindrical vessel of said chamber causes a simultaneous axial tightening of all the gaskets.

10. Filtration chamber according to claim 9, wherein said sealing gaskets consist of O-ring toroidal gaskets.

11. Filtration chamber according to claim 9, wherein at least one sealing gasket is interposed between an upper horizontal surface of said bottom plate and a lower horizontal surface of said anchor ring, and at least another sealing gasket is interposed between an upper horizontal surface of said anchor ring and the lower surface of a horizontal rib integral with the wall of said chamber.

12. Filtration chamber according to claim 9, further comprising sealing means for hermetically sealing the filtration chamber, said sealing means including two tightening flanges, one of said flanges being fixed to the bottom plate, and the other flange being fixed to the wall of the chamber, and at least one sealing gasket being interposed between two opposite horizontal surfaces of the two tightening flanges.

13. Filtration chamber comprising a vertically disposed cylindrical vessel having a bottom vertically displaceable between a raised position to close the filtration chamber and a lower position to open the filtration chamber, means for vertically displacing the bottom between said raised position and said lowered position, said bottom comprising a detachable bottom plate forming a support for a filtering system, said filtering system comprising a filter sheet and a filter netting bed, both anchored to said bottom plate, said filter sheet and said filter netting bed being fixed at their periphery onto an anchor ring, and said anchor ring being provided with means for rapidly locking it onto said bottom plate.

14. Filtration chamber according to claim 13, wherein said filter sheet is in the form of one of a punched plate and a grate, and is fixed to said anchor ring along its entire periphery by welding.

15. Filtration chamber according to claim 13, wherein said filter netting bed is fixed to said anchor ring along its entire periphery by one of welding and packing into a groove.

16. Filtration chamber according to claim 13, wherein said means for rapidly locking said anchor ring onto the bottom plate comprise a bayonet system having a plurality of bayonet anchor teeth distributed along the periphery of said anchor ring.

17. Filtration chamber according to claim 16, wherein said anchor ring is housed into an annular shoulder formed along the periphery of said bottom plate, said bayonet anchor teeth being formed on the inner periphery of said anchor ring and, respectively, on the peripheral surface of said annular shoulder facing the ring.

18. Filtration chamber according to claim 13, further comprising a multiple system of sealing gaskets positioned in annular grooves between opposed horizontal surfaces, such that the closing of the bottom against the cylindrical vessel causes a simultaneous axial tightening of all the gaskets.

19. Filtration chamber according to claim 18, wherein at least one sealing gasket is interposed between an upper horizontal surface of said bottom plate and a lower horizontal surface of said anchor ring, and at least another sealing gasket is interposed between an upper horizontal surface of said anchor ring and the lower surface of a horizontal rib integral with the wall of the chamber.

20. Filtration chamber according to claim 18, further comprising sealing means for hermetically sealing the filtration chamber, said sealing means including two tightening flanges, one of said flanges being fixed to the bottom, and the other flange being fixed to the wall of the chamber, and at least one sealing gasket being interposed between two opposite horizontal surfaces of the two tightening flanges.

* * * * *